US008103660B2

(12) United States Patent
Hupfer et al.

(10) Patent No.: US 8,103,660 B2
(45) Date of Patent: Jan. 24, 2012

(54) COMPUTER METHOD AND SYSTEM FOR CONTEXTUAL MANAGEMENT AND AWARENESS OF PERSISTENT QUERIES AND RESULTS

(75) Inventors: Susanne C. Hupfer, Lexington, MA (US); Steven I. Ross, South Hamilton, MA (US); Daniel M. Gruen, Newton, MA (US); John F. Patterson, Carlisle, MA (US); Nishanth R. Sastry, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 12/017,990

(22) Filed: Jan. 22, 2008

(65) Prior Publication Data

US 2009/0187541 A1    Jul. 23, 2009

(51) Int. Cl.
*G06F 17/00* (2006.01)
(52) U.S. Cl. ........ 707/722; 707/706; 707/713; 707/736; 707/758; 707/791; 707/802; 714/57; 705/2; 705/3; 709/218
(58) Field of Classification Search .................. 707/706, 707/713, 722, 736, 758, 791, 802, 999.002, 707/999.003, 999.004, 999.005, 999.006; 705/2, 3; 714/57; 709/218
See application file for complete search history.

(56) References Cited

U.S. PATENT DOCUMENTS

| | | | |
|---|---|---|---|
| 5,943,497 A | 8/1999 | Bohrer et al. | |
| 6,023,578 A | 2/2000 | Birsan et al. | |
| 6,108,635 A | 8/2000 | Herren et al. | |
| 6,609,132 B1 | 8/2003 | White et al. | |
| 6,691,134 B1 * | 2/2004 | Babula et al. | 1/1 |
| 7,130,861 B2 | 10/2006 | Bookman et al. | |
| 7,139,774 B2 | 11/2006 | Dettinger et al. | |
| 7,143,091 B2 | 11/2006 | Charnock et al. | |
| 7,240,330 B2 | 7/2007 | Fairweather | |
| 7,428,555 B2 | 9/2008 | Yan | |
| 7,707,159 B2 | 4/2010 | Christianson et al. | |
| 2002/0059069 A1 * | 5/2002 | Hsu et al. | 704/257 |
| 2003/0101151 A1 * | 5/2003 | Holland | 706/45 |
| 2004/0139107 A1 * | 7/2004 | Bachman et al. | 707/104.1 |

(Continued)

OTHER PUBLICATIONS

Heer, J., et al., "liquid: Context-Aware Distributed Queries," Group for User Interface Research, Computer Science Division, University of California, Berkeley.
Http://en.wikipedia.org/wiki/RSS (Jan. 18, 2008).
Spangler, S., et al. "COBRA-Mining Web for Corporate Brand and Reputation Analysis," IBM Almaden Research Center.
www.google.com/alerts (Jan. 18, 2008).

*Primary Examiner* — Syling Yen
(74) *Attorney, Agent, or Firm* — Hamilton, Brook, Smith & Reynolds, P.C.

(57) ABSTRACT

Presented is a computer system and user interface for seamlessly integrating the creation and submission of persistent queries, and for collecting and presenting the real-time results of those queries, into the context of one's work and directly structured work artifacts. Users are provided a real-time awareness of what is happening to their persistent queries and their results, from within the work context of the artifact and program application used during creation and submission of the queries. Rather than having to visit a separate alerting application, the user is able to manage queries and query results directly from a subject application, such as a problem-solving application.

15 Claims, 8 Drawing Sheets

U.S. PATENT DOCUMENTS

| | | |
|---|---|---|
| 2004/0220893 A1 | 11/2004 | Spivack et al. |
| 2007/0088723 A1* | 4/2007 | Fish .............................. 707/100 |
| 2008/0154873 A1* | 6/2008 | Redlich et al. .................... 707/5 |
| 2008/0162498 A1 | 7/2008 | Omoigui |
| 2009/0158099 A1* | 6/2009 | Cui .................................. 714/57 |
| 2009/0248753 A1* | 10/2009 | Tsai et al. ..................... 707/202 |

* cited by examiner

COMPUTER METHOD AND SYSTEM FOR CONTEXTUAL MANAGEMENT AND AWARENESS OF PERSISTENT QUERIES AND RESULTS

GOVERNMENT SUPPORT

The invention was made with government support under Contract No. TIA H98230-05-3-0001 awarded by the U.S. Department of Defense. The Government has certain rights in this invention.

BACKGROUND OF THE INVENTION

Complex tasks such as Investigative Analysis & Business Intelligence gathering often require searching electronic data sources (such as databases, the WWW—World Wide Web a global computer network, or other data repositories) and analyzing the results returned by the search. In many cases, these searches are not just simple transient queries that search a data source, return results, and are finished; rather, the searches consist of persistent queries that continually monitor one or more data sources and return a stream of results. They may be high-level semantic inquiries, such as "Monitor all calls made by customers to a customer service representative" or "Monitor all news articles on Company ABC and new product advertising."

How to manage these persistent queries, and the results they return, is both an organizational and attention-management problem. In the course of one's problem-solving work, how does one organize and manage persistent queries and results in such a way that one will notice relevant results in a timely manner? In terms of organization, some current alert systems provide a web page for setting up and managing queries, and then email results to a user with a certain frequency (for example, Google Alerts at www.google.com/alerts, emails updates of the latest relevant Google results on a particular topic to a user at a chosen interval, e.g. once a day or as they happen). RSS feeds provide another mechanism to manage persistent queries: A user subscribes to information sources of interest, and an RSS reader checks the subscribed feeds at intervals for new content. Other current solutions provide support for setting up an organizational framework (such as hierarchical "themes") for classifying results (e.g. IBM's COBRA system, at cobrademo.almaden.ibm.com/cobraTesco/). In terms of drawing a user's attention to relevant results, these systems take varying approaches. Some (e.g. Google Alerts) merely email results to the user with a specified frequency. With RSS feeds, the user must check for new information by accessing the RSS reader whenever desired. Similarly, with classified alert systems such as COBRA, the user must check the system periodically to see how many new results have been collected for each "theme".

There are two significant drawbacks of these existing systems as a means for managing persistent queries and results. The first is that the existing mechanisms fail to support contextual management of persistent queries and their results, i.e. queries are issued and results are accessed by mechanisms that are independent of the user's main work environment and work artifacts. For example, a user may be conducting an investigative analysis by modelling a particular problem, and wishes to issue persistent queries and monitor their results in real-time. Existing techniques (such as those mentioned above) require a user to manage the desired queries and results independent of the work application (whether a modelling application, word processing document or slide presentation, etc.). Rather than relying on the inherent structure of the problem, solution, or work artifacts, the user may need to create a separate organizational scheme to classify queries and collect results (e.g. COBRA).

A second drawback of the existing mechanisms is that the awareness of results is not very immediate or contextual. Since both email and RSS are polling-based technologies, users will at best only see the new results relating to their queries when they check their email or read their RSS feeds; since the technologies are not real-time, they don't offer a way to tell the user what is happening "right now" with regard to their queries. With specialized alerting systems (e.g. COBRA), users must also access the system in order to view new results. If users do not access these alerting systems often enough, they run the risk of missing important information when it gets created or changes. Moreover, the organization of results in each of these systems depends on the user explicitly setting up an organizational scheme (e.g. email or RSS folders, COBRA themes) for collecting alerts/results that best matches the work at hand, but this requires extra work and is separate from the structure of the work artifacts, problem, or solution.

SUMMARY OF THE INVENTION

The present invention addresses the foregoing problems and disadvantages of the prior art. In particular the present invention provides a mechanism and user interface for seamlessly integrating the creation and submission of persistent queries, and for collecting and presenting the real-time results of those queries, into the context of one's work, and directly structured work artifacts. Users are provided a real-time awareness of what is happening to their persistent queries and their results, from within the work context that gave rise to the need for, and submission of, the queries. Rather than having to visit a separate alerting application, the user is able to manage queries and results directly from a subject application, such as a problem-solving application, for example.

One embodiment allows the construction of complex persistent queries (by creating a graphical model describing the attributes of the desired result) directly from within the context of a problem modeling-and-solving application. The invention system also collects the results of those queries within the same context from where they were issued. The invention system also provides visual awareness of new results that have been collected for each query, and also bubbles up (presents or otherwise provides) this awareness through higher levels of the hierarchical problem/solution model. Taken together, the contextual nature of the query construction/submission and results collection, as well as the contextual awareness of results, provide a natural framework for the user to create, submit, find, and manage persistent queries and their results.

In a preferred embodiment, a computer-implemented method and system enables users to manage persistent queries. Given an artifact of a computer program application, the given artifact having a respective context, the invention system creates a query in the context of the given artifact and in a structurally or semantically meaningful place in said context. Said creating includes drawing relevant data from the given artifact into the query being created. Next the system implements the query, issues the query and obtains the results of the query. In real-time (or near real-time) of the results, the invention system provides the results to a user in the context of the given artifact. The user is enabled to specify persistent queries and to see query results without leaving the computer program application and in a structurally or semantically meaningful place in the given artifact.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows. The present invention allows a user to:

(a) Create and submit persistent queries directly from the context of modelling a problem and/or its solution.

(b) Easily and/or automatically draw relevant information from the context of the model into the query being created.

(c) Be aware (in real-time) of results collected for each of these queries, again directly from the context of modelling a problem and/or its solution.

(d) Easily pull specific results back into the context of the model of the problem/solution (for example, as evidence to support a hypothesis).

(e) Find relevant queries and results by browsing the context of the problem/solution, without leaving the work context.

The present invention has a number of advantages over existing systems/methods to persistent query management. These advantages include the following.

Unlike using email or polling-based RSS feeds to make users aware of new results, applicants' mechanism makes users aware of new results in real-time. Email and RSS are generally "pull" mechanisms; a user must explicitly "check email" or "read an RSS feed" to obtain information, and the data is as old as the messages that were sent or published. In contrast, the present invention mechanism for results awareness supports notifications (i.e. "push" functionality or periodic polling and the like); a user will see up-to-date results immediately through the user interface, without having to visit a separate application.

Users can easily maintain an awareness of results for multiple models/investigations at the same time. For example, a user will be able to tell how many results have accumulated (and how many have been read, versus how many are new/unread) for each of their investigations and each of their models. This up-to-the-minute information may lead users to make better decisions about when to revisit their various investigations and models.

While techniques such as email or RSS may require a user to leave a problem-solving application for another application (i.e. email client or RSS reader), the present invention does not require a user to leave the context of their work environment to view persistent query results—the invention is embedded directly within a work application (in this particular case, a problem modeling application).

Though the present invention was specifically developed in the context of a problem modeling application, it is interesting to note that the solution may apply to other work applications as well, and to users other than modelers of problems. Consider, for instance, a consultant who is conducting a technology sector analysis and drafting a word processing document or slide presentation. This consultant wishes to be kept apprised of news articles involving a particular company or domain, since those may affect the analysis. The present invention can conceptually be used in this work context—the word processing document or slide presentation—by embedding persistent queries into the document, e.g. a query such as "Monitor all news articles on Company ABC and new product advertising" could be embedded where the document section about Company ABC appears. A visual indicator could be used to indicate that new results have accumulated for that query, and the analyst would have a real-time awareness of those results, directly from the relevant context of the work artifact.

One embodiment is implemented as part of the IBM (International Business Machines, Inc.) CRAFT Project. CRAFT is an application that supports collaborative reasoning, built on top of Eclipse using Java, and permits users to create any number of "Investigations", each of which consists of any number of "Models". Users create graphical models of problems (or problem solutions).

Figure 1:
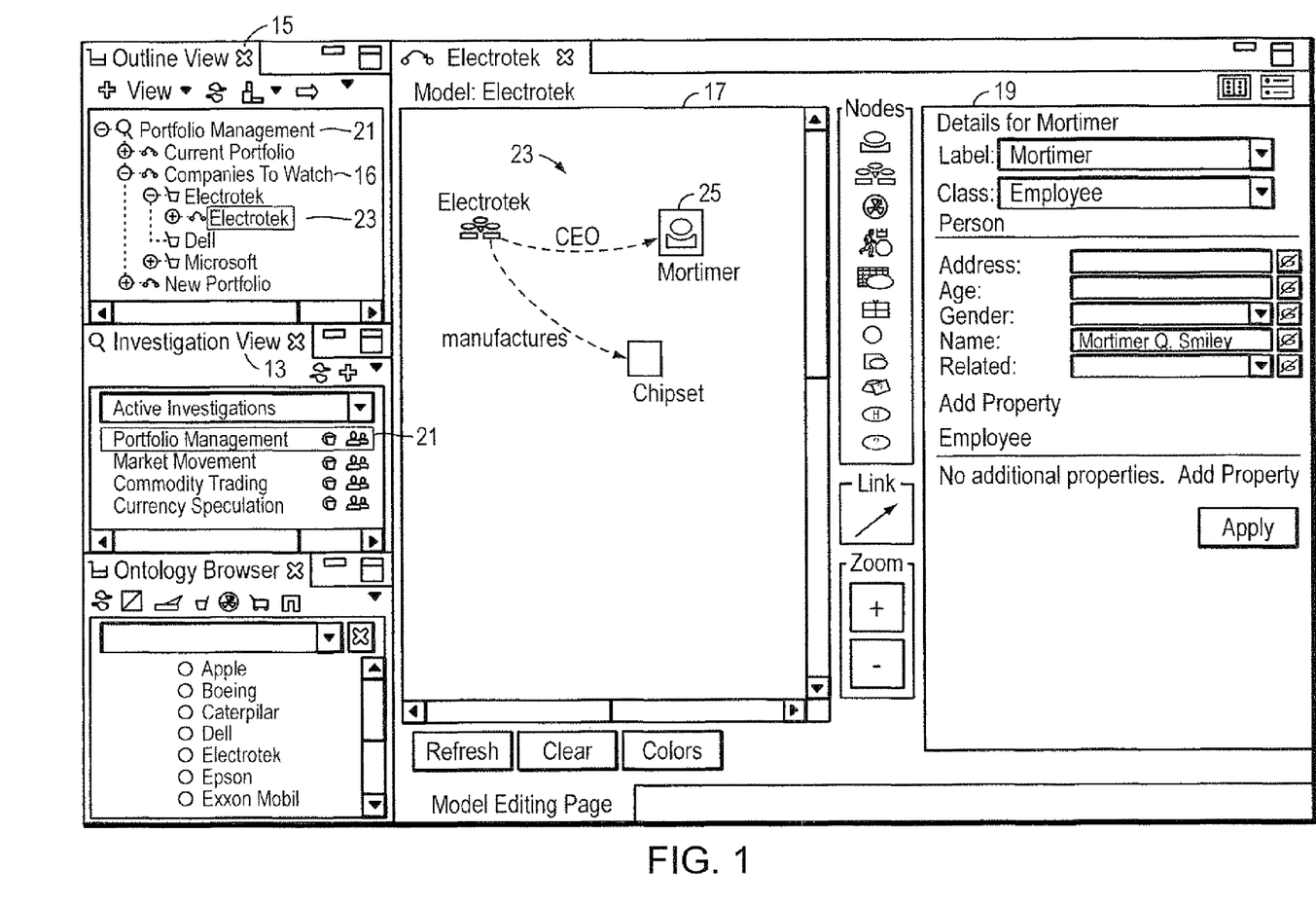
FIG. 1 is a schematic illustration of a screen view of a subject model (artifact) in a problem-solution modeling application.

FIG. 1 shows the CRAFT user interface of a user (perhaps an investment analyst) who has several "Active Investigations" (shown on the left hand side, in the middle panel 13 entitled "Investigation View"). The user is currently focused on the investigation 21 called "Portfolio Management" (highlighted in the Investigation View 13). The hierarchical structure of the "Portfolio Management" investigation 21 is shown in the panel 15 at the upper-left, entitled "Outline View". One component "model" within the "Portfolio Management" investigation 21 is called "Companies to Watch" 16 and that model in turn has components that are models of several different companies. The user has opened the model 23 for the "Electrotek" company; the center panel 17 shows a graphical representation of the "Electrotek" model 23, and the user has selected the modeled entity 25 labeled "Mortimer". The user-modeler has entered the name "Mortimer Q. Smiley" for the entity 25 (as shown in the Details pane 19 at the right).

Figure 2:
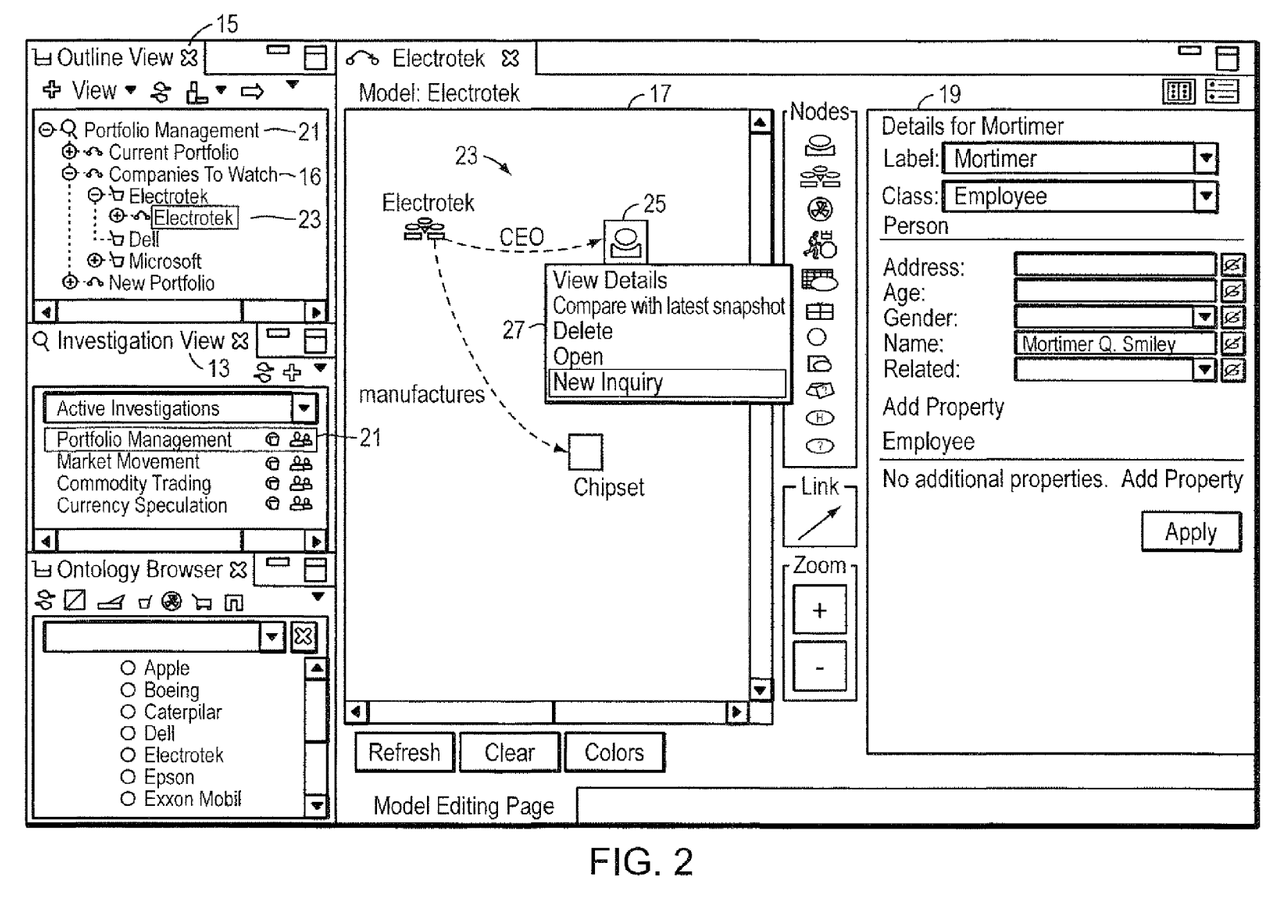
FIGS. 2-4 are schematic illustrations of screen views of persistent queries and user specification of same in the present invention embedded in the problem-solution modeling application of FIG. 1.

The user-modeler now wants to monitor the Electrotek press releases issued by Mortimer 25. This is done by creating a persistent query within the context of the model (e.g., Electrotek model 23). In FIG. 2, the user-modeler starts constructing a new persistent query by right-clicking on Mortimer entity 25 and choosing "New Inquiry" from the menu 27.

Figure 3:
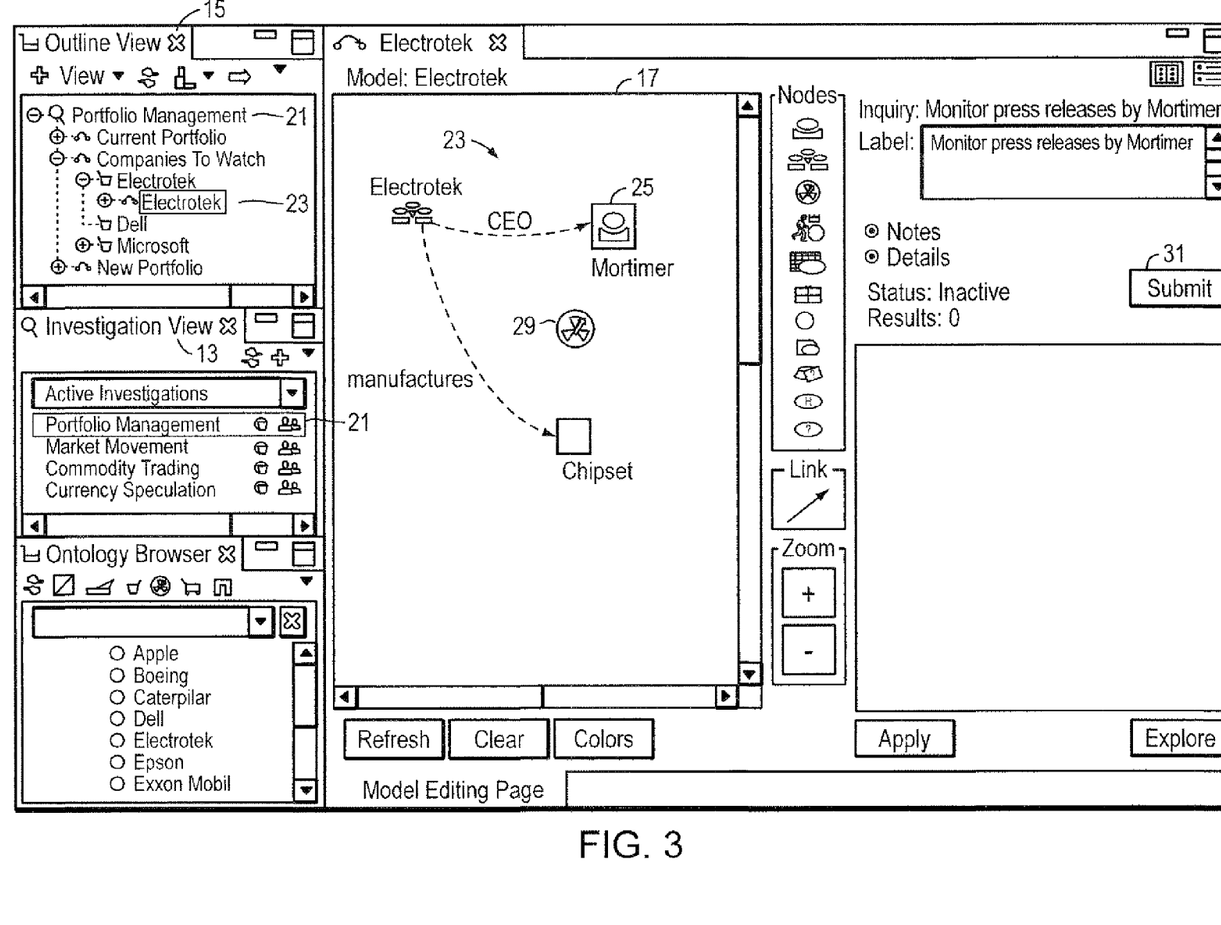

The user gives the new query 29 the label "Monitor press releases by Mortimer", and the query 29 is represented by its own icon in the model 23, as shown in FIG. 3. Known general icon creation and labeling techniques are employed.

Figure 4:
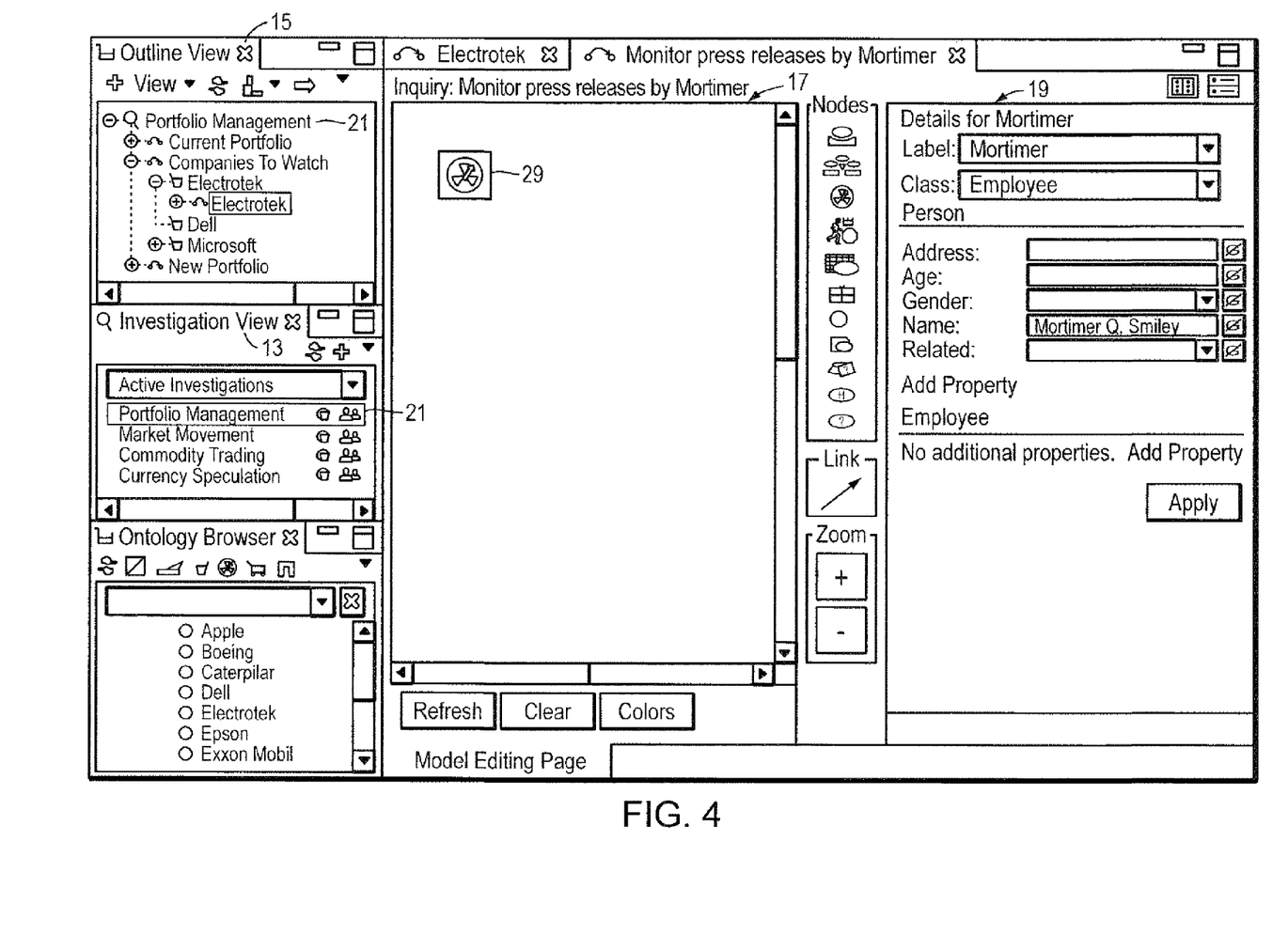

Creating the query 29 from the context of the model 23 allows the system 11 (FIGS. 5, 8) to draw (copy, duplicate, populate and the like) already known or modeled information about the entity Mortimer 25 into the query 29. As the user constructs the query (which is also done graphically in the center pane 17), Mortimer's name, "Mortimer Q. Smiley", is automatically supplied for use in the query 29, as shown in Details pane 19 of FIG. 4. That is, in response to user selection of the "New Inquiry" menu 27 item, system 11 generates a model for query 29 in center pane 17. The query model (generally 29) is a submodel of Electrotek model 23 and shares data between the two models 29, 23. User-interaction (including graphical specification and other details definition) with query model 29 is then supported as for any other model 23 in the system.

Figure 5:
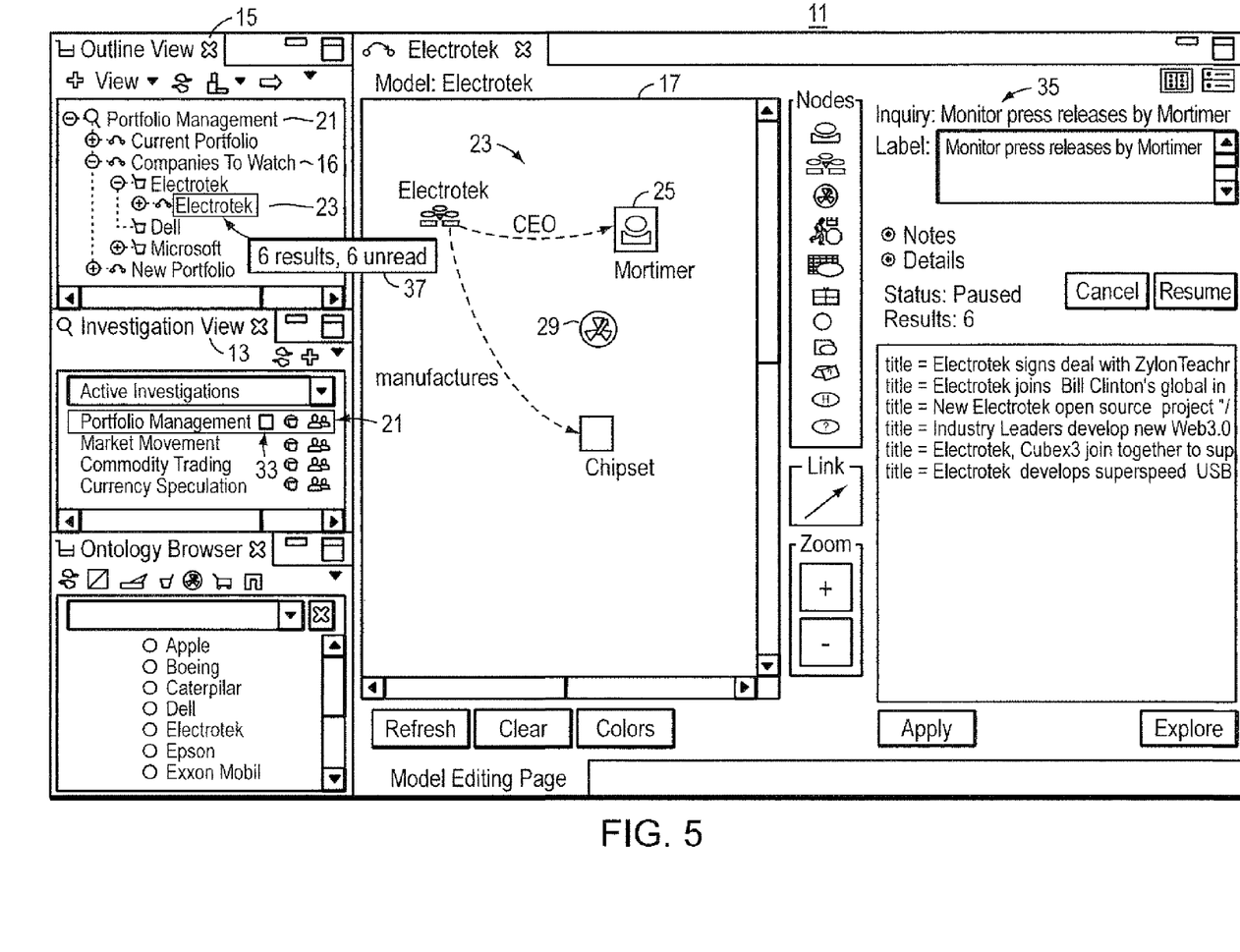
FIG. 5 is a schematic illustration of a screen view providing query results in the system and application of FIGS. 1-4.

Once the user has graphically constructed query 29, the user can issue the query by clicking on the "Submit" button 31 (shown in FIG. 3). FIG. 5 illustrates how query results continuously accumulate (in the Inquiry panel 35 at the right hand side); in the illustrated example, titles of press releases begin to appear. Since the query 29 was constructed in the context of the model 23 that it relates to, the results are automatically associated with the proper work context. The user may visit other models and do other work, but knows that he/she can easily locate the results of "Monitor press releases by Mortimer" by viewing the Electrotek model 23, where the query 29 was constructed and submitted.

FIG. 5 also illustrates how the user is made aware of new results. In the "Investigation View" panel 13, the "Portfolio Management" investigation 21 shows two blue (colored) bars 33 in the decorator immediately to the right of the text; this indicates that new results are available within that investigation. The "Outline View" panel 15 in the upper left similarly shows a blue (colored) decorator on both the "Electrotek" 23 and "Companies to Watch" 16 items, indicating that there are new results in the "Electrotek" model 23. When the user hovers the cursor over the "Electrotek" item 23 in "Outline View" panel 15, details about the results (both total results and new/unread results) are displayed in the form of a tooltip 37 or otherwise. If the "Companies to Watch" item 16 were not expanded to show Electrotek item 23, the blue decorator on the "Companies to Watch" 16 text would be an indication that results have accumulated somewhere in the hierarchy below it, and a tooltip with details would also be available. These results indicators (and corresponding tooltips) bubble or are otherwise provided upward through the hierarchy, all the way up to the investigation level (i.e. "Portfolio Management" 21 in this example). In the present invention, the user does not need to leave the work environment to visit any external alerting system in order to have awareness that persistent queries (e.g., query 29) have generated new results.

In the invention, the user-modeler may wish to use certain query results or parts thereof as "evidence" associated with hypotheses or claims in the subject model 23. To do so, the user simply selects the results lines from the Inquiry pane 35 (shown at the right in FIG. 5), and drags them into the model 23. 'Copy'/'Paste' technology supports this operation. Those results thereby become "Evidence", and are easily associated with the relevant model 23.

Figure 8:
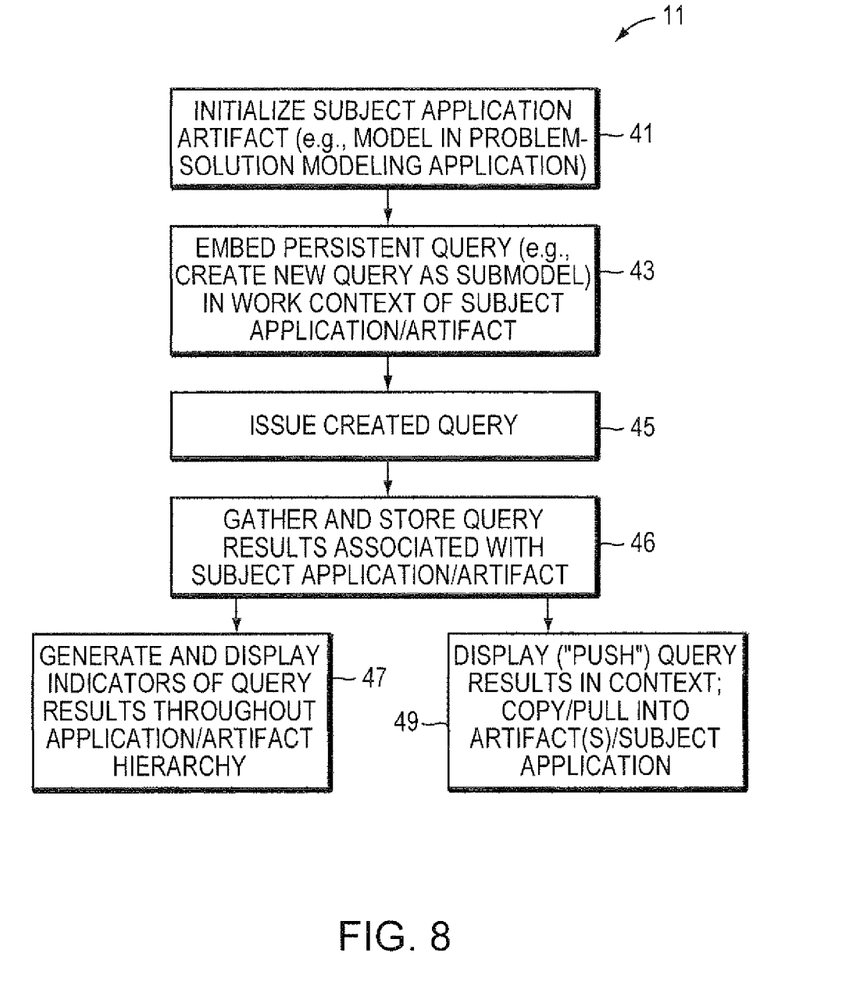
FIG. 8 is a flow diagram of one embodiment of the present invention.

Accordingly embodiments of the present invention are implemented by the process or similar system and elements of FIG. 8. The invention system 11 is preferably a part of a subject application program, such as a problem-solution modeling application, a word processing application and the like. The invention system 11 begins by initializing a user-selected or otherwise given artifact of the subject application (step 41). The subject application artifact is thus for example a problem-solution model, a word processor document and so forth.

Responsive to user request and specification, assembly member/step 43 of system 11 creates and embeds a persistent query in the given artifact. This is accomplished using the subject application operations and functions, as well as is done in the work context of the subject application. In this way, data is shared (copied, duplicated, used for automated-population) between the given artifact and the persistent query being created. Thus in the case of the subject application being a problem-solution modeling application and the given artifact is a certain model in the problem-solution modeling application, the query creation is generated as a submodel in the certain model as described above in FIGS. 2-4.

After user creation and specification of the query, step or member 45 issues the persistent query in accordance with user command. Query interpretation and implementation may be accomplished with techniques common in the art.

Step or unit 46 gathers query results as generated and stores the query results in connection with (or otherwise associated with) the subject application artifact. That is, for each artifact that has one or more associated queries, respective query results are tracked and stored. Known data structures such as trees, lists, links, caches and the like are employed. In turn, this enables the real-time presentation of the query results (ongoing) to the user and in the context of the subject artifact as discussed above in FIG. 5. Step/display element 49 accomplishes the real time or near real-time timing using known 'Push' technology, periodic polling or the like. This also enables the user to read/access the query results (i) without being required to open or launch (and log into) other applications programs and (ii) without leaving the subject application.

The data structures and techniques used to embed and associate the persistent query with the subject artifact provide the connection/association of the query results to the subject artifact. This allows step 49 to further support copy/paste, pulling data and similar data sharing functions between the query results and the subject artifact (as well as with various other artifacts and throughout the subject application) as described above with reference to FIG. 5.

In addition, step/element 47 generates and displays indications of the query results in the subject application. In particular, the subject application maintains a hierarchy or other listing of artifacts using the data structures mentioned above. Step 47 places indicators accordingly in a display of the artifact listing/hierarchy to maintain awareness by the user of query results for multiple artifacts. The indicators may include indication of how many results have accumulated, how many results have been read, how many results are new and/or how many results have not been read. Tool tip, comments and other similar techniques, flags and counters are employed here as further described in FIG. 5 above.

Figure 6:
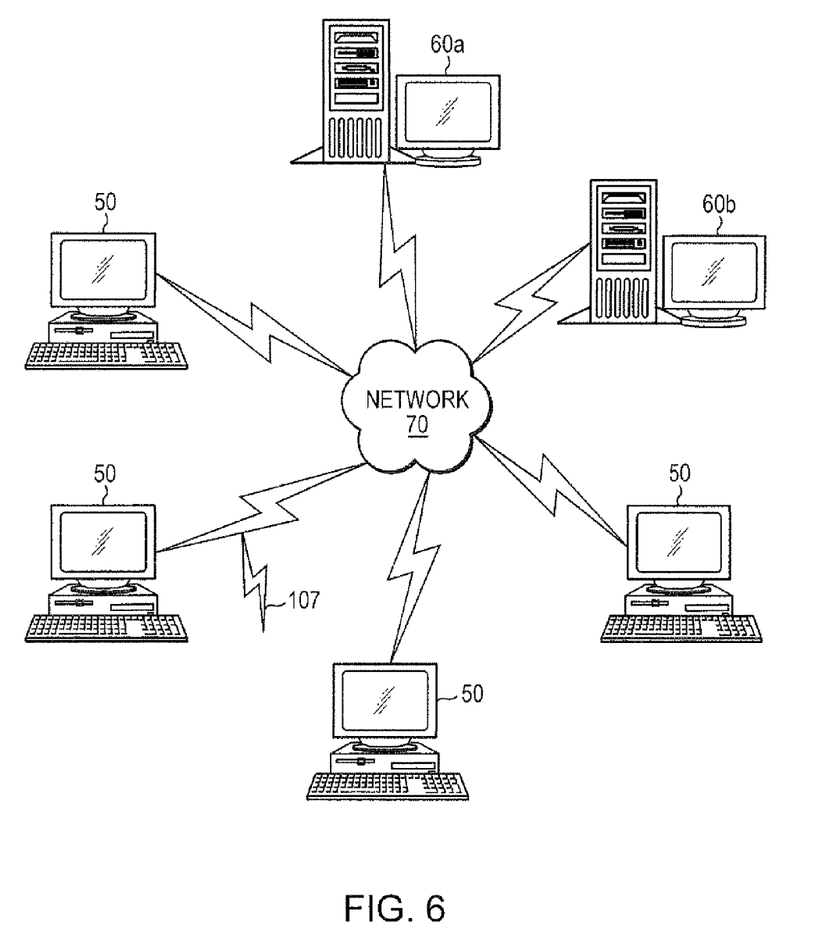
FIG. 6 is a schematic view of a computer network in which embodiments of the present invention may be implemented.

FIG. 6 illustrates a computer network or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
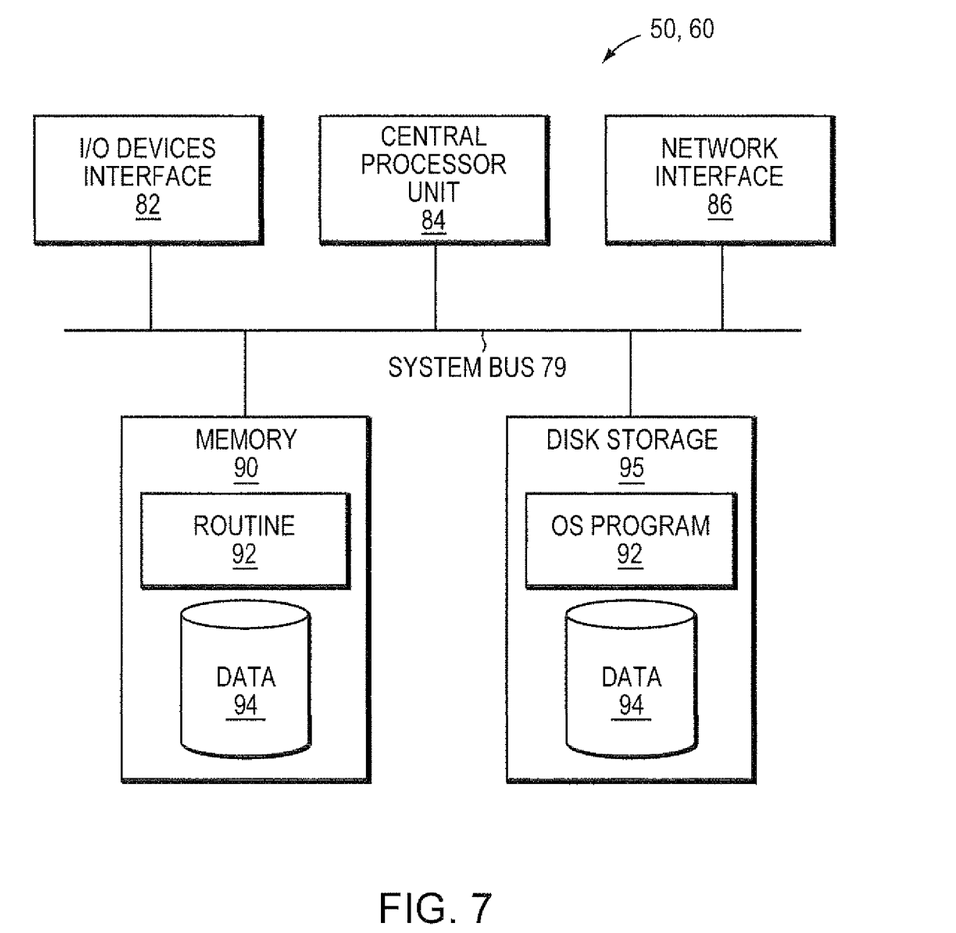
FIG. 7 is a block diagram of a computer node in the network of FIG. 6.

FIG. 7 is a diagram of the internal structure of a computer (e.g., client processor 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., embedding persistent queries 29 in subject application/artifact and query results management method/process detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 6 and 7 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further example details of model engines, graphical query specification and related support elements (e.g., ontology) are found in assignees US patent application for "Computer Method and Apparatus for Graphical Inquiry Specification With Progressive Summary" (Attorneys Docket number CAM9-2007-0209) and U.S. patent application Ser. No. 11/867,890 entitled "A Method and Apparatus For Providing On-Demand Ontology Creation and Extension" filed Oct. 5, 2007. Both are herein incorporated by reference.

What is claimed is:

1. A computer-implemented method of managing persistent queries, comprising:

given a model as an artifact in a computer program modeling application, the given model having a respective context in the application, creating and embedding a query in the given model, the query being a submodel of the given model;

said creating including drawing relevant data from the given model into the query being created;

implementing the query by issuing the query from the given model, and obtaining results of the query including collecting results of the query within the same context as the given model which is the respective context in the application, the given model being one of multiple different models in the modeling application, each model having a respective different context in the modeling application, and each model having respective queries as submodels, wherein each of the queries is persistent within its respective model;

in real-time of the results, providing the query results to a user in the context of the given model, such that the user generates queries and sees query results (i) in the same context as each other and as that of the given model and thus in a structurally meaningful place in the given model, and (ii) without leaving the computer program modeling application such that the user is able to maintain an awareness of different query results for the multiple different models;

wherein the computer program modeling application is a problem-solution modeling application and each model is a problem-solution model; and the method further comprises the step of enabling the user to maintain an awareness of different query results for the multiple problem-solution models.

2. A method as claimed in claim 1 wherein the step of providing the results utilizes any of push technology and polling, and eliminates requiring the user to use a separate computer application to retrieve the results.

3. A method as claimed in claim 1 further comprising copying data from the results into the given model.

4. A method as claimed in claim 1 further comprising enabling the user to find one or more relevant queries and results by browsing in the computer program application.

5. A method as claimed in claim 1 wherein the step of creating the query is in the context of one problem-solution model and includes drawing relevant data from the one problem-solution model into the query being created.

6. A method as claimed in claim 1 wherein enabling further includes, for each problem-solution model, any one or combination of:
   indicating how many results have accumulated,
   indicating how many results have been read,
   indicating how many results are new, and
   indicating how many results have not been read.

7. A method as claimed in claim 6 wherein the indicating employs visual indicators.

8. Computer apparatus for managing persistent queries, comprising:
   given a model as an artifact in a computer program modeling application, the given model having a respective context in the modeling application, a computer processor executing:
   an assembly member creating a persistent query in the context of the given model, including drawing relevant data from the given model into the query being created, the query being a submodel of the given model;
   a unit responsive to the assembly member, the unit implementing the query by issuing the query from the given model and obtaining results of the query including collecting results of the query within the same context as the given model which is the respective context in the modeling application, the given model being one of multiple different models in the modeling application, each model having a respective different context in the modeling application and each model having respective queries as submodels wherein each of the queries is persistent within its respective model; and
   in real-time of the results, a display element providing the query results to a user in the context of the given model, such that the user is able to generate queries and see query results (i) in the same context as each other and as that of the given model, producing a structurally meaningful place in the given model, and (ii) without leaving the computer program modeling application such that the user is able to maintain an awareness of different query results for the multiple different models;
   wherein each model is a different problem-solution model and the computer program modeling application is a problem-solution modeling application, each problem-solution model having a respective different context in the application.

9. Computer apparatus as claimed in claim 8 wherein the display element utilizes any of push technology and polling, and eliminates requiring the user to use a separate computer application to retrieve the results.

10. Computer apparatus as claimed in claim 8 wherein the display element further enables copying data from the results into the given model.

11. Computer apparatus as claimed claim 8 wherein the display element further enables the user to find one or more relevant queries and results by browsing in the computer program modeling application.

12. A method as claimed in claim 8 wherein the display element further includes, for each problem-solution model, any one or combination of:
   an indication of how many results have accumulated,
   an indication of how many results have been read,
   an indication of how many results are new, and
   an indication of how many results have not been read.

13. Computer apparatus as claimed in claim 8 wherein the display element employs visual indicators indicating any one or combination of:
   how many results have accumulated,
   how many results have been read,
   how many results are new, and
   how many results have not been read.

14. A computer system for managing persistent queries, comprising:
   given one of multiple different problem-solution models in a computer problem-solution modeling application, each problem-solution model having a respective different context in the modeling application, one or more computer processors having:
   query creation means for creating a persistent query in the context of the given one model, the creation means further enabling relevant data to be drawn from the given one model into the query being created, the query being a submodel of the given one model;
   issue means for implementing the query, issuing the query from the given one model and obtaining results of the query including collecting results of the query within the same context as the given one model which is the respective context in the modeling application;
   each problem-solution model having respective queries as submodels, wherein each of the queries is persistent within its respective problem-solution model; and
   display means, in real-time of the results, the display means providing the query results to a user in the context of the given one model, such that the user generates queries and sees query results without leaving the computer modeling application and in a structurally meaningful place in the given one model such that the user is able to maintain an awareness of different query results for the multiple problem-solution models.

15. A computer program product comprising a computer useable storage medium having a computer readable program for managing persistent queries, wherein the computer readable program when executed on a computer causes:
   given multiple different problem-solution models in a computer problem-solution modeling application, each problem-solution model having a respective different context in the application, creating a persistent query in the context of one of the given models, the query being a submodel of the one model;
   said creating including drawing relevant data from the one model into the query being created;
   implementing the query including issuing the query from the one model and obtaining results of the query within the same context as the one model which is the respective context in the application, each problem-solution model having respective queries as submodels, wherein each of the queries is persistent within its respective problem-solution model; and in real-time of the results, providing the query results to a user in the context of the one model, such that the user generates queries and sees query results without leaving the computer modeling application and in a structurally or semantically meaningful place in the one model, and such that the user is able to maintain an awareness of different query results for the multiple problem-solution models.

* * * * *